United States Patent
Zeng et al.

(10) Patent No.: US 11,545,675 B2
(45) Date of Patent: Jan. 3, 2023

(54) CATALYTIC CATHODE FOR A LITHIUM-OXYGEN BATTERY

(71) Applicant: UChicago Argonne, LLC, Chicago, IL (US)

(72) Inventors: Xiaoqiao Zeng, Naperville, IL (US); Khalil Amine, Oakbrook, IL (US); Jun Lu, Naperville, IL (US); Yuanyuan Guo, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 65 days.

(21) Appl. No.: 16/988,279

(22) Filed: Aug. 7, 2020

(65) Prior Publication Data
US 2022/0045337 A1 Feb. 10, 2022

(51) Int. Cl.
H01M 4/92 (2006.01)
H01M 12/08 (2006.01)
H01M 12/02 (2006.01)
H01M 4/88 (2006.01)
H01M 4/86 (2006.01)

(52) U.S. Cl.
CPC ........ *H01M 4/926* (2013.01); *H01M 4/8871* (2013.01); *H01M 12/02* (2013.01); *H01M 12/08* (2013.01); *H01M 2004/8689* (2013.01); *H01M 2300/0028* (2013.01)

(58) Field of Classification Search
CPC .... H01M 4/926; H01M 4/8871; H01M 12/02; H01M 12/08; H01M 2004/8689; H01M 2300/0028
See application file for complete search history.

(56) References Cited

U.S. PATENT DOCUMENTS

| 2013/0230783 A1* | 9/2013 | Amine | H01M 50/411 977/773 |
| 2014/0255798 A1* | 9/2014 | Amine | H01M 4/9016 429/405 |
| 2020/0006817 A1* | 1/2020 | Barde | H01M 10/44 |

\* cited by examiner

*Primary Examiner* — Victoria H Lynch
(74) *Attorney, Agent, or Firm* — Foley & Lardner LLP

(57) ABSTRACT

A metal-air battery includes an anode; a low-dimensional catalyst cathode; and an electrolyte; wherein: the low-dimensional catalyst cathode comprises a functional metal layer on a carbon support overcoated with a catalyst layer; the electrolyte comprises an aprotic solvent that is an ether-based solvent, a fluorinated ether-based solvent, an oligo (ethylene oxide) solvent, or a mixture of any two or more thereof; and the electrolyte is free of carbonate solvents.

16 Claims, 6 Drawing Sheets

CATALYTIC CATHODE FOR A LITHIUM-OXYGEN BATTERY

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to air cathode batteries. In particular, it is related to metal-air cathodes.

BACKGROUND

Lithium-oxygen batteries have already proven that they are one of the most promising energy storage systems, having an energy density comparable to that of gasoline. The electrochemical catalyst air electrode is critical to improve the rate performance, cyclability, and round-trip efficiency of lithium-oxygen batteries, but the use of such catalysts inevitably leads to concerns about the additional costs and needed processing, the low areal energy density due to the limited active sites, and pore clogging due to non-uniform distribution of the materials.

SUMMARY

In one aspect, a metal-air battery is provided, the battery including an anode, a low-dimensional catalyst cathode, and an electrolyte including a salt and an aprotic solvent, wherein: the low-dimensional catalyst cathode includes a functional metal layer on a carbon support; a catalyst layer at least partially overlaying the functional metal layer; the aprotic solvent comprises an ether-based solvent, a fluorinated ether-based solvent, an oligo (ethylene oxide) solvent, or a mixture of any two or more thereof; and the electrolyte is free of carbonate solvents.

In another aspect, a low-dimensional catalyst cathode includes a catalyst layer overlaying a functional metal layer on a carbon support, wherein the low-dimensional catalyst cathode is a 2D or 0D catalyst cathode.

In a further aspect, a method of forming a low-dimensional catalyst cathode includes selecting a cathode layer material and a functional metal layer material, wherein the functional metal layer material dewets the cathode layer material; depositing the functional metal layer material on a carbon support; and depositing the cathode layer material on at least a portion of the functional metal layer material on the carbon support.

BRIEF DESCRIPTION OF THE DRAWINGS

FIG. 1a includes the definition of wetting and de-wetting in a typical metal-nonmetallic substrate system, FIG. 1b is the formation of dimensionally-reduced Pt on a metal layer that is on a carbon black substrate for a lithium oxygen battery, and the relating regular open circuit voltage (OCV) for each cell, according to the examples.

FIGS. 2a-d are the STEM images for the characterization of 3D Pt clusters on carbon black powder, and FIGS. 2e-h are the 0D Pt clusters on Au modified carbon black powder, according to the examples.

FIG. 3A: the base materials of carbon black, 2 nm Cr on carbon, and 2 nm Au on carbon; FIG. 3B: 3D Pt/C at nanoparticulate sizes of 2 nm, 5 nm, and 10 nm; FIG. 3C: 2D C/Cr/Pt at 2 nm Cr with varying transverse dimensions of Pt at 2 nm, 5 nm, and 10 nm; FIG. 3D 0D C/Au/Pt at 2 nm Au with varying transverse dimensions of Pt nanoparticles at 2 nm, 5 nm, and 10 nm; in the voltage range of 2.2-4.5 V vs. Li+/Li within the fixed capacity, according to the examples.

DETAILED DESCRIPTION

Figure 1:
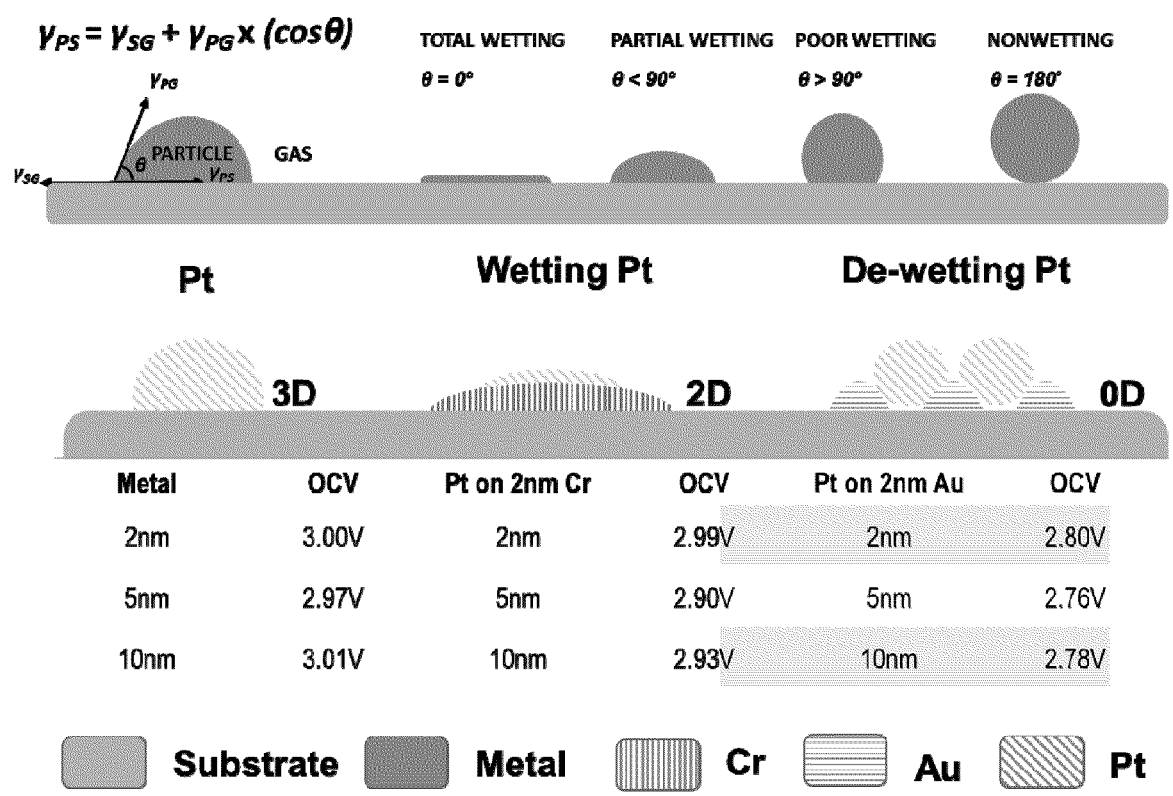
FIG. 1 depicts nano-engineering strategies for generating ultra-small wetting and de-wetting to provide for dimensionality-reduced Pt catalysts on the substrate, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. For example, about 5 nm may mean from 4.5 nm to 5.5 nm.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Here, we report a novel fabrication technique to construct noble metal enabled air electrodes as cathodes for an oxygen evolution reaction (OER) system (i.e. cathodes that enable the reduction of 02). By using the methods described herein, catalyst dimensionality may be reduced, resulting in higher yields and efficiencies of the catalysts, which in turn reduces costs and improves operation. The techniques all for a decrease in dimensionality from 3D, to 2D (wetting), and to 0D (de-wetting). The cathodes effectively exhibit low charge potential (i.e. "low" charge potential is considered to be about 3.15 to 3.3V), and extended cycle life. This dimensionally constrained catalyst layer leads to an improvement in the areal energy, and the power density without additional materials or complicated processes following the discharge-charge cycles in the oxygen gas. The cathodes described herein may be used in lithium-air battery, a sodium-air battery, a potassium-air battery, a magnesium-air battery, or a zinc-air battery. In some embodiments, the metal-air battery is a lithium-air battery.

As provided in more detail below, a dual-layer low-dimensional catalyst enabled cathode is constructed with a functional layer and a catalyst layer. By using the thin film deposition technique, the reduction of catalyst dimensionality was achieved by applying the wettability of various metals. The dimensions of such catalysts are dramatically decreased from 3D to 2D (wetting) and eventually to 0D (de-wetting). In applying this to a typical lithium-oxygen cell, the achieved cathode loading with a dimensionally-controlled catalyst provides for a low charge potential and extended cycle life. It is believed that the dimensional constrained catalyst layer is responsible for improvements in areal energy and power density, without any additional materials or complicated processes after the discharge-charge cycles in oxygen.

In a first aspect, a metal-air battery includes an anode; a low-dimensional catalyst cathode; and an electrolyte. In the metal-air battery, the low-dimensional catalyst cathode includes a functional metal layer on a carbon support, wherein the functional metal layer is at least partially overcoated with a catalyst layer. In some embodiments, the functional metal layer is wholly overcoated by the catalyst layer, where the catalyst layer may range from a film like morphology to nanoparticles dispersed over the surface of the functional layer.

It has been found that the low-dimensional catalyst structures significantly reduce battery overpotentials that are typically observed. For example, in some embodiments, the overpotential of a battery employing the low-dimensional catalysts enabled cathode is on the order of about 0.2 V with enhanced cyclability. In comparison, tradition carbon cathodes, carbon with a metal layer (i.e. Cr or Au) cathodes, or with carbon with Pt cathodes (i.e. the materials individually on the support) exhibit a significantly larger overpotential that is on the order of about 1.0 V with poor cyclability. Without being bound by theory, it is believes that the dual-layer (the functional metal layer on the carbon support with an overlaying catalyst layer) stabilizes the formation of peroxides, and the dual-layer acts as the catalyst for the OER in the metal-air, or lithium-air cells, with the result being lower charge overpotentials. During operation of a lithium-air battery incorporating the cathode catalyst material, at least some of the lithium may be present as $Li^+$.

As noted, the low-dimensional catalyst layer may be sequestered on a carbon support to provide a substrate on which to deposit the functional metal layer and then disperse nanoparticles of the catalyst. The carbon support also provides a high surface area to assist in air contact with the cathode catalysts. The carbon support material may be a carbon material that does not interfere with the operation of the catalyst or the batteries. Illustrative carbon supports include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotube, multi-walled carbon nanotubes, carbon nanotube arrays, or a mixture of any two or more thereof. Commercial examples of carbon black include, but are not limited to, TIMCAL Super C45®, Super-P®, Black Pearls® 2000, Denka Black®, Vulcan® XC72R, and Ketjenblack®.

On the carbon support is a low-dimensional catalyst comprising of a dual-layer material. The first layer is the functional metal layer that is deposited on the carbon support, the functional metal layer having a functional role as a wetting or dewetting layer. The second layer of the dual-layer material is the catalyst layer that is then deposited as an at least partial overcoating on the functional metal layer. The functional metal layer may have a transverse dimension to the layer (i.e. a "thickness") of about 1 nm to about 5 nm. This includes where the functional metal layer is about 2 nm to about 5 nm, about 1 nm to about 2 nm, or is about 2 nm. The catalyst layer may have a transverse dimension of about 2 nm to about 20 nm. This includes from 2 nm to 10 nm. The transverse dimension is used to quantify the catalyst layer as it may vary from a film-like morphology (as in the 2D materials) to a particle-like dimension (as in the 0D materials) when measured transverse to the plane of the substrate.

As introduced above, the functional metal layer may be wetting or dewetting. Whether a particular metal is wetting or dewetting is dependent upon the material used in the catalyst layer where the interaction of the catalyst metal may be "wetted" by the functional metal layer, or it may be "dewetted" by the functional metal layer. As used herein, "wetting" and "dewetting" are used in a context analogous to the interaction between a surface and water droplet. For example, where a surface is said to be "wetted," the water droplet spreads on the surface, while a surface that is not wetted," i.e. "dewetted," is where the water droplet will bead up on a surface. FIG. 1 is a depiction of the measure of wetting, partial wetting, poor wetting, and nonwetting in terms of the angle θ (theta), as measured with respect to a surface. A totally "wetting surface" has a θ=0°, a "partial wetting" surface has a θ<90°, a "poor wetting" surface has a θ>90°, a "non-wetting" surface has a θ=180°. By way of example, FIG. 1 also shows illustrative metal combinations of Pt (catalyst layer) on Cr (a wetting functional metal layer for the Pt), and Pt (catalyst layer) on Au (a de-wetting functional metal layer for the Pt; i.e. trends toward a non-wetting surface with respect to Pt). As also illustrated in FIG. 1 a, the 3D surface is an isolated particle of the catalyst on a surface. The 2D structure is achieved by creating a wetted Pt layer on Cr functional layer. The wetted Pt shows a film-like or layer-layer like character. The 0D structure is achieved by creating a dewetted Pt layer on Au function layer, in which the Pt becomes more of a nanoparticulate, or nano-clustermorphology. In some embodiments, the materials trend toward a low-dimensionality dual layer material, or, in other words, where the carbon substrate/functional metal layer/catalyst layer structure trends toward a 0D material. In some embodiments, the low-dimensional catalyst cathode is a 2D catalyst cathode.

As noted, the functional metal layer is deposited on the carbon support. Illustrative metals for the functional metal layer include, but are not limited to, Al, Si, Ti, V, Cr, Co, Ni, Cu, Zn, Ge, Nb, Mo, Pd, Ag, In, Sn, Ir, Pt, Au, and combinations of any two or more thereof. In some embodiments, the functional metal layer includes Cr, Cu, Ag, Au, or a mixture of any two or more thereof. In further embodiments, the functional metal layer includes Cr or Au.

The catalyst layer is deposited on the functional metal layer, and overlays (or overcoats) at least a portion (i.e. at least partially) of the functional metal layer on the carbon support. Illustrative materials for the catalyst layer include, but are not limited to, Mn, Fe, Co, Ni, Ru, Pd, Ag, Os, Ir, Pt, or a combination of any two or more thereof. In some embodiments, the catalyst layer includes Ni, Pd, Ir, Pt, or a combination of any two or more thereof. In some embodiments, the catalyst layer includes Pt. In some embodiments, the functional metal layer includes Cr or Au, and the catalyst layer includes Pt.

In one aspect, the low-dimensional catalyst dual-layer is a thin film. Accordingly, the average transverse dimension of the dual-layer may be from about 1 nm to about 20 nm, inclusive.

In addition to the cathode structures described above that include the carbon support, functional metal layer, and overlaying catalyst layer, the cathodes may also include a current collector, a conductive lithium host material, a filler material, or a combination of any two or more thereof. Illustrative current collectors include, but are not limited to, copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen. Illustrative conductive lithium host materials include $Li_2O$, $Li_2O_2$, LiOH, $Li_2CO_3$. Illustrative filler materials include, passive carbon, carbon fibers, and other carbon materials as described herein.

The metal-air batteries also include an anode. Illustrative anode materials include, but are not limited to, a lithium foil, lithium mesh, lithium nanoparticles, lithiated carbon, lithiated tin, lithiated silicon, a sodium foil, sodium mesh, sodium nanoparticles, sodiated carbon, sodiated tin, sodiated silicon, a potassium foil, potassium mesh, potassium nanoparticles, potassiated carbon, potassiated tin, potassiated silicon, a magnesium foil, magnesium ribbon, magnesium mesh, magnesium nanoparticles, magnesiated carbon, magnesiated tin, magnesiated silicon, a zinc foil, a zinc ribbon, zinc mesh, zinc nanoparticles, zincated carbon, zincated, tin, or zincated silicon. In some embodiments, the metal-air battery is a lithium-air battery, accordingly, the anode may include a lithium foil, lithium mesh, lithium nanoparticles, lithiated carbon, lithiated tin, or lithiated silicon. In other embodiments, the anode may include a lithium foil, lithium mesh, or lithium nanoparticles. It should be noted that, in some embodiments, during operation of the metal-air battery, where the metal is lithium, at least some of the lithium is present as $Li^+$.

The anodes may also include a current collector. Illustrative current collectors include, but are not limited to, copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen.

In some embodiments, the metal-air batteries include a separator between the anode and cathode. Such separators tend to be made of a microporous or modified glass fiber or polymer separator. Illustrative separators include, but are not limited to, Celgard® 2325, Celgard® 2400, Celgard® 3501, and a glass fiber separator.

The electrolyte for the metal-air battery includes a salt and an aprotic solvent. The salt may be a salt of lithium, sodium, potassium, magnesium, or zinc, generically referred to here as "M". Illustrative M' salts include those of (alkyl fluorophosphates), (alkyl fluoroborates), (4,5-dicyano-2-(trifluoromethyl)imidazole), (4,5-dicyano-2-methylimidazole), (2,2',2''-tris(trifluoromethyl)benzotris(imidazolate)), $N(CN)_2$, $CF_3CO_2$, $C_2F_5CO_2$, $CF_3SO_3$, $CH_3SO_3$, $N(SO_2CF_3)_2$, $N(SO_2F)_2$, $C(CF_3SO_2)_3$, $N(SO_2C_2F_5)_2$, $ClO_4$, $BF_4$, $AsF_6$, $PF_6$, $BF_2(C_2O_4)$, $B(C_2O_4)_2$, $PF_2(C_2O_4)_2$, $PF_4(C_2O_4)$, $AsF_6$, F, $PF_6$, $N(SO_2CF_3)_2$, $N(SO_2F)_2$, $(B_{12}X_{12-p}H_p)$, $(B_{10}X_{10-p'}H_{p'})$; or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10. Illustrative lithium salts include, but are not limited to lithium alkyl fluorophosphates, lithium alkyl fluoroborates, lithium 4,5-dicyano-2-(trifluoromethyl)imidazole, lithium 4,5-dicyano-2-methylimidazole, trilithium 2,2',2''-tris(trifluoromethyl) benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, LiF, LiCl, LiBr, $LiN(SO_2CF_3)_2$, LiN $(SO_2F)_2$, $Li_2(B_{12}X_{12-p}H_p)$; $Li_2(B_{10}X_{10-p'}H_{p'})$; or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10. It should be noted that for those lithium salts specifically called out above, the lithium may alternatively be replaced 1:1, or mixed with, Na or K. In some embodiments, illustrative salts for use in the electrolytes include, but are not limited to, lithium salts such as $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, LiN $(SO_2C_2F_5)_2$), lithium alkyl fluorophosphates, $Li(C_2O_4)_2$, $LiBF_2C_2O_4$, $Li_2B_{12}X_{12}$-pHp, $Li_2B_{10}X_{10}$-yHy, or a mixture of any two or more lithium salts, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10. The concentration of the salt may be from about 0.1M to about 5M. This may include from about 0.1 M to about 2M, from about 0.5 M to about 2M, or about 1 M.

The solvent of the electrolyte may be an aprotic solvent that is an ether-based solvent, a fluorinated ether-based solvent, an oligo (ethylene oxide) solvent, or a mixture of any two or more thereof. Illustrative solvents include, but are not limited to, glyme, diglyme, tetrahydrofuran, tetraethylene glycol dimethylether, tri(ethylene glycol)-substituted methyltrimethyl silane, ethylene glycol-substituted methyltrimethyl silane, di(ethylene glycol)-substituted methyltrimethyl silane, acetonitrile, dimethyl sulfoxide, dimethylformamide, triethyl phosphate, N,N-dimethylacetamide, N-methyl pyrrolidone, methoxybenzene, and ionic liquids. In some embodiments, the aprotic solvents may include ether-based solvents, fluorinated ether-based solvent, and oligo (ethylene oxide) solvents. In other embodiments, illustrative solvents include, but are not limited to glyme, diglyme, tetrahydrofuran, tetraethylene glycol dimethylether, tri (ethylene glycol)-substituted methyltrimethyl silane (1NM3), ethylene glycol-substituted methyltrimethyl silane (1NM1), and di(ethylene glycol)-substituted methyltrimethyl silane (1NM2), acetonitrile (ACN), dimethyl sulfoxide (DMSO), dimethylformamide (DMF), triethyl phosphate, N, N-dimethylacetamide (DMA), N-methyl pyrrolidone (NMP), methoxybenzene, and mixtures of any two or more thereof. In some embodiments, the aprotic solvent may be one or more of tetraethylene glycol dimethylether, tri (ethylene glycol)-substituted methyltrimethyl silane, ethylene glycol-substituted methyltrimethyl silane, or di (ethylene glycol)-substituted methyltrimethyl silane. In other embodiments, the aprotic solvent may be one or more of tri (ethylene glycol)-substituted methyltrimethyl silane, ethylene glycol-substituted methyltrimethyl silane, or di (ethylene glycol)-substituted methyltrimethyl silane. In any of the embodiments described herein, the electrolyte is free of carbonate solvents. Thus, the electrolyte may be subject to the proviso that it is free of a carbonate solvent.

In another aspect, a low-dimensional catalyst cathode is provided. The cathode includes a catalyst layer overlaying a functional metal layer on a carbon support, wherein the low-dimensional catalyst cathode is a 2D or 0D catalyst cathode. The materials for the function metal layer are any of those as described herein. The carbon supports are any of those as described herein. The material for the catalyst layer is any of those as described herein. For example, the functional metal layer may include Al, Si, Ti, V, Cr, Co, Ni, Cu, Zn, Ge, Nb, Mo, Pd, Ag, In, Sn, Ir, Pt, Au, or a mixture of any two or more thereof; and the catalyst layer may include Mn, Fe, Co, Ni, Ru, Pd, Ag, Os, Ir, Pt, or a combination of any two or more thereof; and the carbon support may include synthetic graphite, natural graphite, amorphous carbon, hard carbon, soft carbon, acetylene black, mesocarbon microbeads (MCMB), carbon black, Ketjen black, mesoporous carbon, a porous carbon matrix, carbon nanotubes, carbon nanofibers, graphene, or a mixture of any two or more thereof.

In another aspect, methods are provided for the formation of the low-dimensional cathode catalysts. The techniques described herein allow for the preparation of a metal-air battery cathode that includes a low-dimensional catalyst film on a carbon support. In the low-dimensional catalyst film, a functional metal layer is deposited onto the carbon support, and overlaying the functional metal layer is a layer of a catalyst material. The functional metal layer may include nanoclusters of the metal, and the catalyst material may also be, in some embodiments, formed as nanoclusters on the functional metal layer. As used herein, a nanocluster is an ultrasmall structure consisting of a small number of atoms, at most in the tens.

The techniques used, i.e. the methods of preparation, may include depositing a functional metal layer on a carbon substrate via a magnetron sputtering deposition system at a specified deposition rate for a specified deposition thickness (i.e. transverse dimension).

In another aspect, a method of forming a low-dimensional catalyst cathode, the method includes selection of the materials based upon their wetting/dewetting properties to form the low dimensional catalyst cathode. For example, the method may include selecting a cathode layer material and a functional metal layer material, wherein the functional metal layer material dewets the cathode layer material. As shown above the ability of the functional metal layer in wetting or dewetting the catalyst layer impacts the morphology of the catalyst layer. Thus, in the method, the selection of the layers to form a cathode of lower dimensionality compared to a 3D morphology (i.e. obtaining a 2D or 0D morphology) is desired. The method then includes depositing the selected functional metal layer material on a carbon support, and depositing the selected cathode layer material on at least a portion of the functional metal layer material on the carbon support.

The present invention, thus generally described, will be understood more readily by reference to the following examples, which are provided by way of illustration and are not intended to be limiting of the present invention.

Examples

Example 1. A thin film deposition technique. All metals were sputtered sequentially onto an active carbon surface of a conductive porous cathode substrate by employing an AJA ACT-2400 thin film deposition system under a base vacuum of about 1×10-7 Torr. The working gas was argon (Ar) at a pressure of 5 mTorr. The deposition rates of metal were from 0.5 Å/s to 1.5 Å/s, as determined by an in-situ quartz crystal microbalance (QCM) thickness monitor (model TM-350 from Maxtek, Inc.). The sputtering time for a deposited metal was defined by using a desired nominal thickness divided by the deposition rate.

The thin film deposition method allows for the reduction of catalyst dimensionality by applying the unique wettability of various metals. The dimensions of catalyst are decreased from 3D, to 2D (wetting), and eventually 0D (de-wetting). The dimensionally constrained catalyst layer is responsible for improvements in areal energy and power density without any additional materials or complicated processes during the discharge-charge cycles in the presence of $O_2$. The fabrication process is straight forward, low-cost, and user-friendly with promising potential for industrialization.

FIG. 1 illustrates several nano-engineering strategies for generating ultrasmall wetting and de-wetting dimensionality-reduced Pt catalysts on the substrate. The dimensionality-reduced Pt was formed in functional metal layers on a carbon black substrate for lithium oxygen batteries, at the relating regular open circuit voltage for each cell. The growth of the deposited catalysts by sputtering theoretically follows the growing of nano-crystalline islands on the Stranski Krastanow (SK) film-substrate systems. It has attracted the attention in device applications due to the advantages of low-cost, convenient, ultrasmall-scale, and repeatable and tunable electronic/optical/magnetic properties. Once a metal is deposited onto a nonmetallic substrate, its growth is generally described according to Vollmer-Weber (VW) principles. That is, the growth mode occurs when metal atoms are more strongly bound to each other than to the substrate, and consequently the three-dimensional islands nucleate and grow on the substrate. The growth mode is qualitatively explained in terms of the surface tension $\Upsilon$, and is interpreted as a force per unit length of boundary relating to the contact point of the island and the substrate. The force equilibrium can be written as $\Upsilon_S = \Upsilon_{S/F} + \Upsilon_F \cos\theta$, where $\theta$ is the island wetting angle, $\Upsilon_S$ is the surface tension of the substrate surface, $\Upsilon_F$ is the surface tension of the film surface, and $\Upsilon_{S/F}$ is the surface tension of the film/substrate interface. For VW growth, the contacting angle $\theta$ is >90° and the particles tend to appear spherical or polyhedral. Additionally, the layer of metal must be thinner than a $\theta$-dependent critical thickness to form a discrete film on the substrate (FIG. 1a).

In the present examples, the critical thickness of sputter-deposited Pt are dependent on the morphology of the substrate and the deposition parameters. As used herein, the "critical thickness" is the minimum transverse dimension from which an aggregate metal is thermodynamically stable. Below the critical thickness, the majority of the Pt is granular, and the grain size or transverse dimension shrinks as the thickness decreases. In the examples presented here, Au and Cr were used as functional layers to form the foundation for the dimensionality reduction treatments. Au and Cr tend to form rough and smooth structures, respectively, after they are deposited on a substrate. Besides Pt, Au or Cr on a thermally grown silicon dioxide or quartz substrate is able to form the unconnected nano-islands as well, by controlling the transverse dimension at less than 4 nm. With the same deposition thickness, Au forms a more granular structure with the $\theta > 90°$, the resulting structure is rougher. This termed the "de-wetting process." On the other hand, Cr nano-islands are flatter, i.e. smoother, with $\theta > 90°$. Thus, Cr forms a "wetting" structure. By applying this strategy, a 2 nm Au or Cr was first sputter-coated on a carbon black loaded carbon fiber substrate to form a pattern layer. Then 2, 5, and 10 nm Pt films were deposited on top of this pattern layer to form the Pt/Au or Pt/Cr bilayer structures. The Au layer was confined within 2 nm to inhibit the growth and expansion of the Pt crystallite on top of the Au, thereby exhibiting the discrete-island structures and the increased surface roughness. Similarly, the 2 nm Cr layer helped expand the Pt crystalline in a flatter distribution. On the Au and Cr functional layers, the original 3D Pt particles transformed into 1D and 2D Pt crystallites, respectively, through the wetting and de-wetting treatment (FIG. 1b). Therefore, the dimensionality of the Pt was reduced and the relating cathodes for lithium oxygen cells were fabricated with this design.

Figure 2:
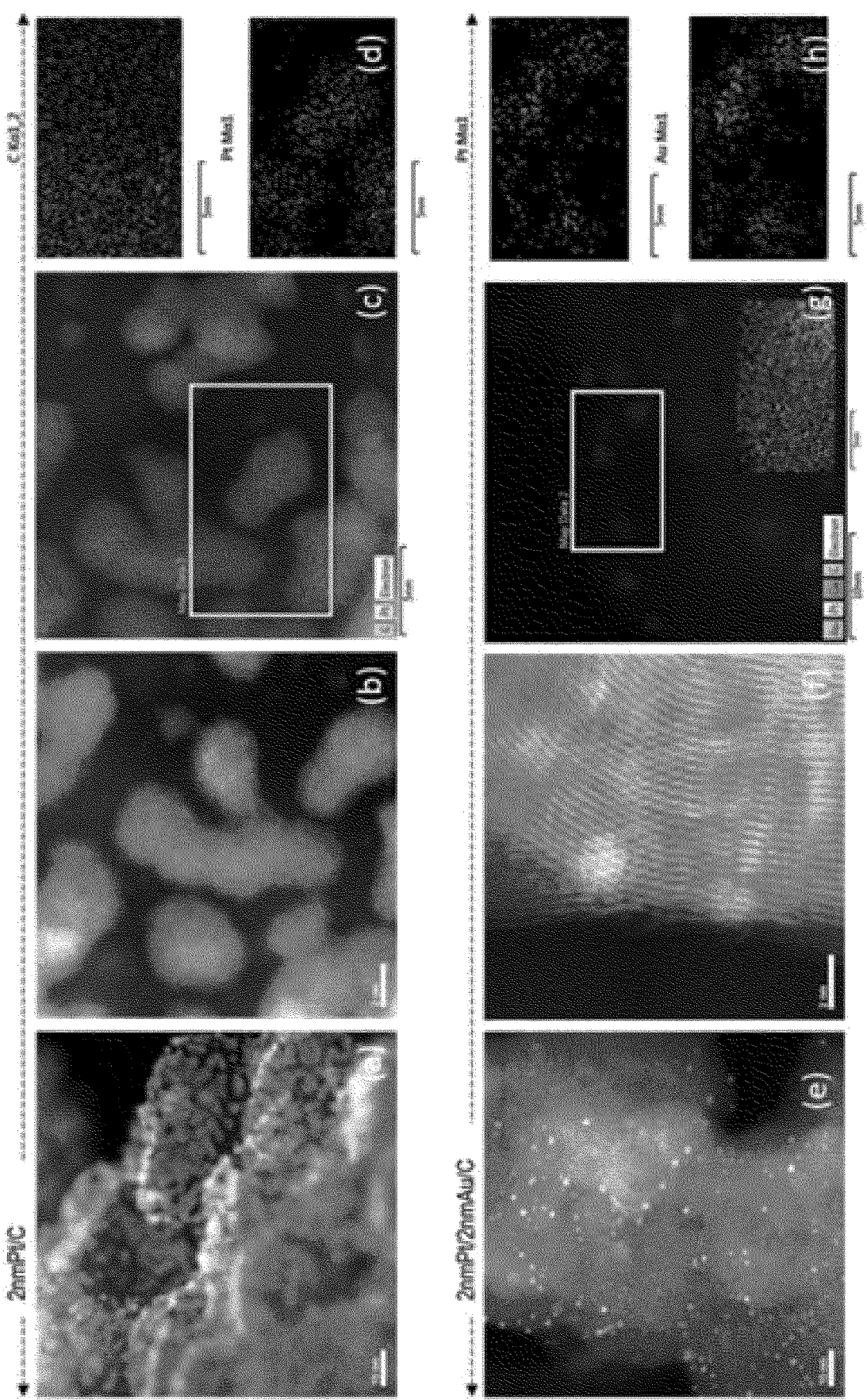
FIG. 2 illustrates a dimensionally-reduced Pt catalyst on a carbon cathode.
Figure 3A:
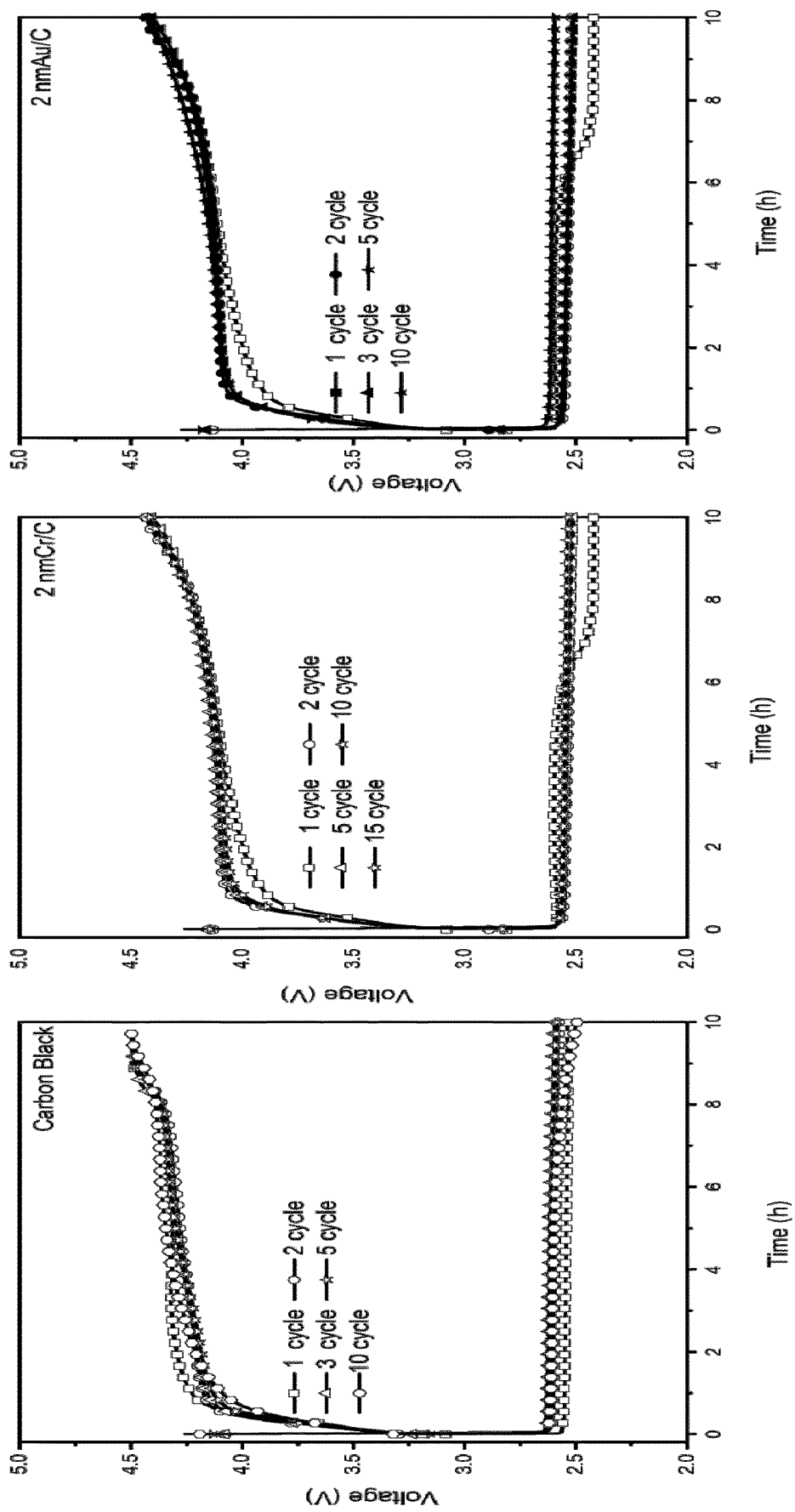
FIGS. 3A-3D are illustrative graphs of the improved galvanostatic charge/discharge profiles (10-15 cycles) of Li—$O_2$ batteries having
Figure 3B:
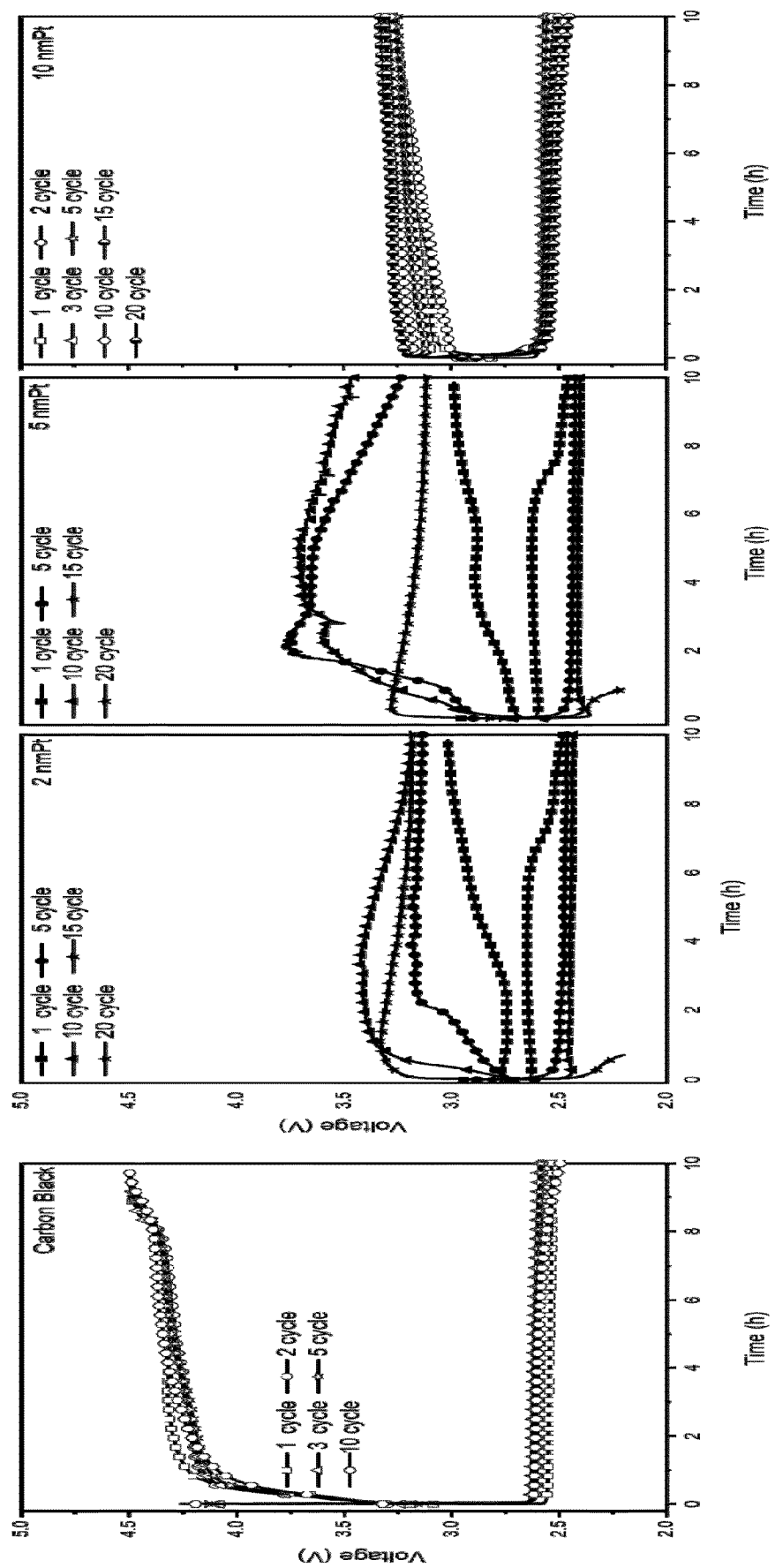
Figure 3C:
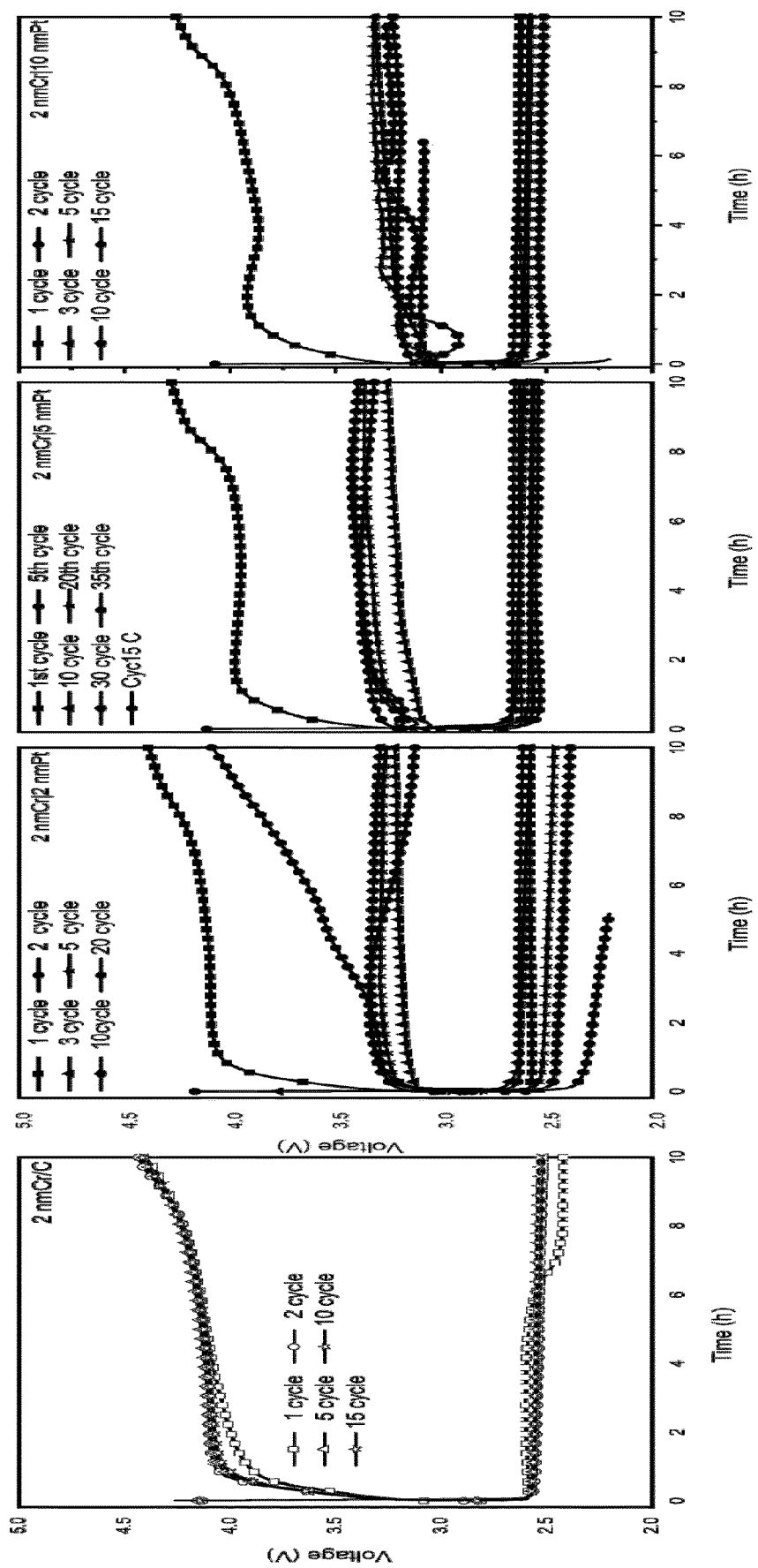
Figure 3D:
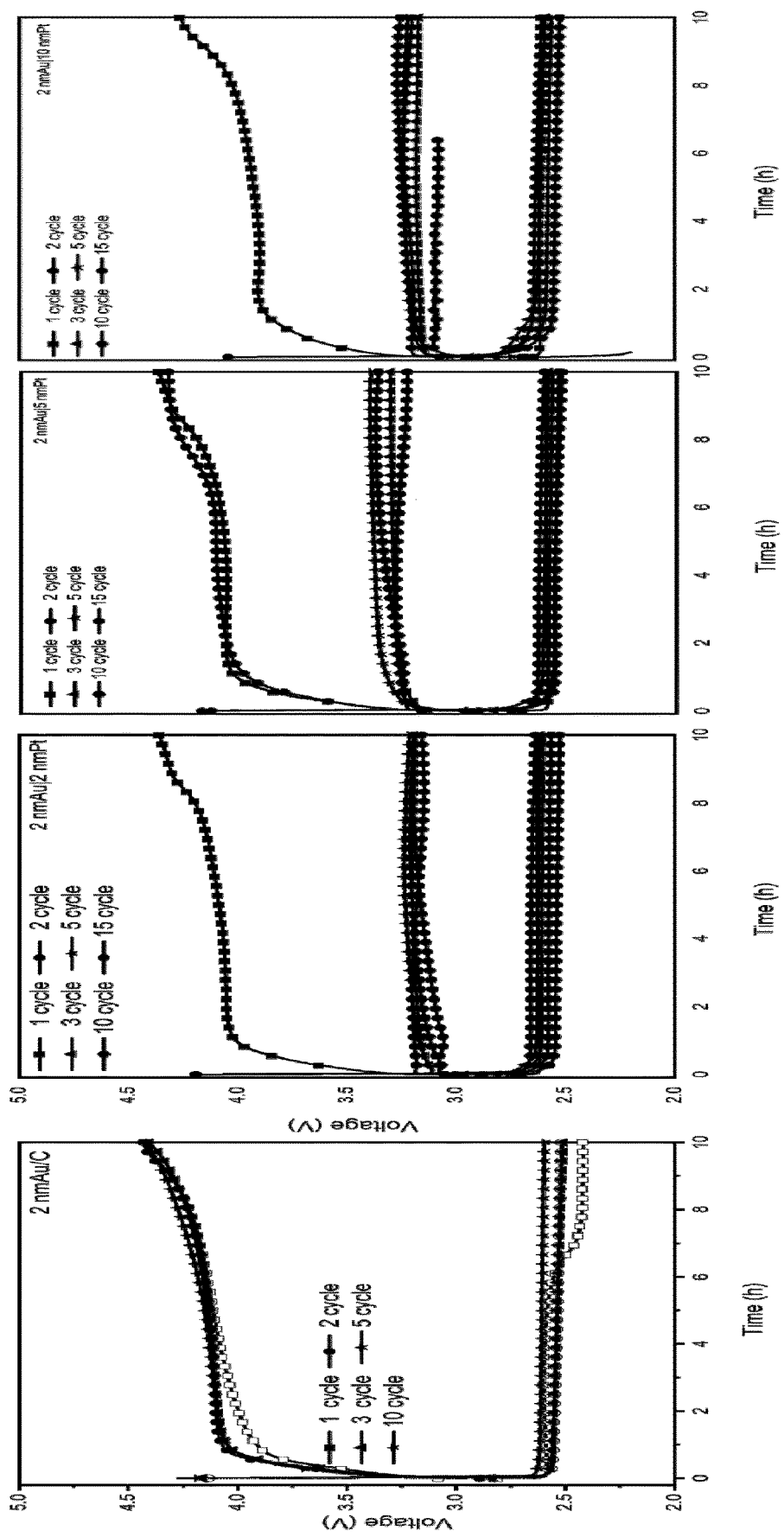

Characterization for dimensionality reduction treatment. FIG. 2 illustrates the dimensionality reduction of the Pt catalysts (e.g. 3D Pt clusters on carbon black powder (a-d) to 0D Pt clusters on Au modified carbon black powder (e-h)) on the cathode through STEM (scanning tunneling microscopy). As illustrated in the images, reduction in dimensionality of the 2 nm deposited Pt catalyst on the Au or Cr functional layers was confirmed by STEM at different magnifications. The naturally deposited Pt particles were determined to be about 10-20 nm in length, less than 5 nm in width and 2 nm in height (FIGS. 2 a-d). Therefore, the particles are 3D island- or spherical-shaped covering on the surface of each carbon black powder. For the 2 nm deposition on the Au layer between the carbon and Pt, the Pt shows nanodot structures indicating the dimension is reduced from 3D to 0D (FIG. 2e-h). The size of each dot is within 5 nm and embedded in the lattice of graphite layer. The metal crystal seeds grow aligned with the carbon lattice during the plasma accumulation. The Au particles effectively prevent the 3D Pt layer from forming through layer agglomeration, and provide numerous tri-phases regions for discharge products deposition. The morphology of the original carbon black is not affected by the deposited Pt nanoparticles.

Example 2. Preparation of an electrochemical cell. Swagelok-type cells with the cathode having low-dimensional catalyst loaded carbon black, from Example 1, were tested under 1 bar $O_2$ atmosphere with a battery and cell tester (MACCOR cycler). Tetraethylene glycol dimethylether (TEGDME) with 1M $LiCF_3SO_3$ was selected as the electrolyte. For comparison, control cells were also prepared containing an untreated carbon black, or Au coated carbon black, or Cr coated carbon black loaded carbon fiber paper cathode. The control cells were tested under similar conditions, with the specific capacities normalized to the loading of the cathode material.

Example 3. Electrochemical cell performance. FIGS. 3A-D illustrate the voltage profile of discharge/charge cycle obtained when the cells were first subjected to discharge. The cells were discharged to a capacity of 300 mAh/g and then charged. A charge plateau appears at approximately 3.2 V for the 0D Au/Pt catalyst cathodes and at approximately 3.3 V for the 2D Cr/Pt catalyst cathodes, while the charge potential of the carbon cathode, and the Cr- and Au-coated cathodes was around 4 V. The specific discharge capacity may be maintained for more than 20 cycles with the 0D Au/Pt catalyst cathodes and for more than 15 cycles with the 2D Cr/Pt catalyst cathodes. This is a significant improvement in overwhelming the high charge overpotential with enhanced cycling performance.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A metal-air battery comprising:
an anode;
a low-dimensional catalyst cathode; and
an electrolyte comprising a salt and an aprotic solvent;
wherein:
the low-dimensional catalyst cathode comprises a functional metal layer on a carbon support wherein the functional metal layer comprises Cr, Cu, Ag, Au, or a mixture of any two or more thereof;
a catalyst layer at least partially overlaying the functional metal layer;
the catalyst layer comprises Mn, Fe, Co, Ni, Ru, Pd, Ag, Os, Ir, Pt, or a combination of any two or more thereof;
the aprotic solvent comprises an ether-based solvent, a fluorinated ether-based solvent, an oligo (ethylene oxide) solvent, or a mixture of any two or more thereof; and
the electrolyte is free of carbonate solvents.

2. The metal-air battery of claim 1, wherein the catalyst layer comprises Ni, Pd, Ir, Pt, or a combination of any two or more thereof.

3. The metal-air battery of claim 1, wherein the functional metal layer comprises Cr or Au, and the catalyst layer comprises Pt.

4. The metal-air battery of claim 1, wherein the low-dimensional catalyst cathode is a 2D catalyst cathode.

5. The metal-air battery of claim 1, wherein the low-dimensional catalyst cathode is a 0D catalyst cathode.

6. The metal-air battery of claim 1, wherein the functional metal layer and the catalyst layer are deposited by a thin film deposition method, wherein a transverse dimension of the functional metal layer is about 1 nm to about 5 nm functional layer, and a transverse dimension of the catalyst layer is about 2 nm to about 20 nm.

7. The metal-air battery of claim 1, wherein the carbon support comprises synthetic graphite, natural graphite, amorphous carbon, hard carbon, soft carbon, acetylene black, mesocarbon microbeads (MCMB), carbon black, Ketjen black, mesoporous carbon, a porous carbon matrix, carbon nanotubes, carbon nanofibers, graphene, or a mixture of any two or more thereof.

8. The metal-air battery of claim 1, wherein the anode comprises lithium, sodium, potassium, magnesium, or zinc.

9. The metal-air battery of claim 1, wherein the electrolyte further comprises a lithium salt.

10. The metal-air battery of claim 1, wherein the aprotic solvent comprises glyme, diglyme, tetrahydrofuran, tetraethylene glycol dimethylether, tri(ethylene glycol)-substituted methyltrimethyl silane, ethylene glycol-substituted methyltrimethyl silane, di(ethylene glycol)-substituted methyltrimethyl silane, acetonitrile, dimethyl sulfoxide, dimethylformamide, triethyl phosphate, N,N-dimethylacetamide, N-methyl pyrrolidone, methoxybenzene, or an ionic liquid.

11. The metal-air battery of claim 10, wherein the aprotic solvent comprises tetraethylene glycol dimethylether, tri (ethylene glycol)-substituted methyltrimethyl silane, ethylene glycol-substituted methyltrimethyl silane, or di (ethylene glycol)-substituted methyltrimethyl silane.

12. The metal-air battery of claim 11, wherein the aprotic solvent comprises tri (ethylene glycol)-substituted methyltrimethyl silane, ethylene glycol-substituted methyltrimethyl silane, or di (ethylene glycol)-substituted methyltrimethyl silane.

13. The metal-air battery of claim 1 that is a lithium-air battery.

14. A low-dimensional catalyst cathode comprising a catalyst layer overlaying a functional metal layer on a carbon support, wherein:
the low-dimensional catalyst cathode is a 2D or 0D catalyst cathode;
the functional metal layer comprises Cr, Cu, Ag, Au, or a mixture of any two or more thereof;
the catalyst layer comprises Mn, Fe, Co, Ni, Ru, Pd, Ag, Os, Ir, Pt, or a combination of any two or more thereof.

15. A method of forming a low-dimensional catalyst for an air cathode, the method comprising:
selecting a catalyst layer material and a functional metal layer material, wherein
the functional metal layer material dewets the catalyst layer material;
depositing the functional metal layer material on a carbon support; and
depositing the catalyst layer material on at least a portion of the functional metal layer material on the carbon support;
wherein:
the functional metal layer comprises Ag, Au, or a mixture thereof;
the catalyst layer comprises Mn, Fe, Co, Ni, Ru, Pd, Ag, Os, Ir, Pt, or a combination of any two or more thereof.

16. The method of claim 15, wherein the catalyst layer comprises Pd, Pt, or a combination of any two or more thereof.

* * * * *